(12) United States Patent
Ye et al.

(10) Patent No.: US 8,419,252 B2
(45) Date of Patent: Apr. 16, 2013

(54) CYLINDRICAL LIGHT GUIDE WITH LIGHT ADUSTABLE FILM ON LIGHT ENTERING SURFACE THEREOF

(75) Inventors: Zhi-Ting Ye, Zaociao Township, Miaoli County (TW); Kuo-Jui Huang, Taichung (TW)

(73) Assignee: Wintek Corporation, Taichung (TW)

( * ) Notice: Subject to any disclaimer, the term of this patent is extended or adjusted under 35 U.S.C. 154(b) by 163 days.

(21) Appl. No.: 13/171,918

(22) Filed: Jun. 29, 2011

(65) Prior Publication Data

US 2012/0002443 A1 Jan. 5, 2012

(30) Foreign Application Priority Data

Jul. 5, 2010 (TW) .................................. 99122067 A

(51) Int. Cl.
*F21V 7/04* (2006.01)
(52) U.S. Cl.
USPC ........ 362/558; 362/608; 362/23.16; 362/551; 362/555
(58) Field of Classification Search ................ 362/23.16, 362/23.17, 500, 551, 555, 558–560, 600–629
See application file for complete search history.

(56) References Cited

U.S. PATENT DOCUMENTS

| 6,637,905 B1 * | 10/2003 | Ng et al. ................ 362/601 |
| 7,686,495 B2 * | 3/2010 | Noba ....................... 362/612 |
| 2004/0246601 A1 | 12/2004 | Okuwaki et al. |
| 2007/0134614 A1 | 6/2007 | Weichselbaum et al. |
| 2007/0201234 A1 | 8/2007 | Otterman |
| 2008/0151577 A1 | 6/2008 | Li |
| 2009/0135623 A1 | 5/2009 | Kunimochi |
| 2010/0053996 A1 | 3/2010 | Zhang et al. |

FOREIGN PATENT DOCUMENTS

| CN | 101206284 | 6/2008 |
| DE | 102004019063 | 12/2004 |
| DE | 10333040 | 2/2005 |
| TW | 200848809 | 12/2008 |
| TW | 200903062 | 1/2009 |
| TW | 200916858 | 4/2009 |

OTHER PUBLICATIONS

TW Office Action dated Oct. 29, 2012.
German language office action dated May 25, 2012.
English language translation of German office action.
Chinese language office action dated Jul. 3, 2012.

(Continued)

*Primary Examiner* — Robert May
(74) *Attorney, Agent, or Firm* — McClure, Qualey & Rodack, LLP

(57) ABSTRACT

A light guiding object for use in a lighting device is provided. The light guiding object includes a cylindrical body, a reflective layer, a transparent resin layer and a light-adjustable film. The cylindrical body has a light-entering surface and a bottom surface. The reflective layer is disposed on the bottom surface of the cylindrical body. The transparent resin layer is disposed on the light-entering surface of the cylindrical body. The light-adjustable film has a flat surface and an optical structure surface, wherein the flat surface is opposite to the optical structure surface and disposed on the transparent resin layer. A central part of the optical structure surface includes a first prism group. The first prism group includes a plurality of first prisms, wherein the apex angles of the first prisms are in a range of 120 to 170 degrees.

12 Claims, 2 Drawing Sheets

OTHER PUBLICATIONS

English language translation of abstract of DE 102004019063 (published Dec. 2, 2004).
English language translation of abstract of DE 10333040 (published Feb. 17, 2005).
English language translation of abstract of CN 101206284 (published Jun. 25, 2008).
English language translation of abstract of TW 200848809 (published Dec. 16, 2008).
English language translation of abstract of TW 200903062 (published Jan. 16, 2009).
TW Office Action dated Dec. 31, 2012.
English Abstract translation of TW200916858 (Published Apr. 16, 2009).

* cited by examiner

CYLINDRICAL LIGHT GUIDE WITH LIGHT ADUSTABLE FILM ON LIGHT ENTERING SURFACE THEREOF

This application claims the benefit of Taiwan application Serial No. 99122067, filed Jul. 5, 2010, the subject matter of which is incorporated herein by reference.

BACKGROUND OF THE INVENTION

1. Field of the Invention

The invention relates in general to a light guiding object and a lighting device using the same, and more particularly to a light guiding object using a light-adjustable film with a prism group, and a lighting device using the light guiding object for increasing light emitting efficiency.

2. Description of the Related Art

The length of the light guiding object for use in tube illumination is at least 600 mm. However, problems such as stress, warpage, adhesive inlet need and poor light-guiding condition may occur to 600 mm light guiding object formed by the injection-molding process, so the light guiding object for use in illumination is normally formed by the extrusion-molding process. However, the design of adding an optical structure to the two ends of the light guiding object formed by the extrusion-molding process requires additional processing which results in other problems such as decreased yield rate and prolonged production time.

SUMMARY OF THE INVENTION

The invention is directed to a light guiding object and a lighting device using the same. A central part of the light-adjustable film of the light guiding object includes a first prism group and the apex angles of the first prisms of the first prism group are in a range of 120 to 170 degrees, so that the light emitting efficiency of the lighting device of the invention is greatly increased.

According to an aspect of the disclosure, a light guiding object for use in a lighting device is provided. The light guiding object includes a cylindrical body, a reflective layer, a transparent resin layer and a light-adjustable film. The cylindrical body has a light-entering surface and a bottom surface. The reflective layer is disposed on the bottom surface of the cylindrical body. The transparent resin layer is disposed on the light-entering surface of the cylindrical body. The light-adjustable film has a flat surface and an optical structure surface, wherein the flat surface is opposite to the optical structure surface and is disposed on the transparent resin layer. A central part of the optical structure surface includes a first prism group. The first prism group includes a plurality of first prisms, wherein the apex angles of the first prisms are in a range of 120 to 170 degrees.

According to another aspect of the disclosure, a lighting device is provided. The lighting device includes a light guiding object and a light source. The light guiding object includes a cylindrical body, a reflective layer, a transparent resin layer and a light-adjustable film. The cylindrical body has a light-entering surface and a bottom surface. The reflective layer is disposed on the bottom surface of the cylindrical body. The transparent resin layer is disposed on the light-entering surface of the cylindrical body. The light-adjustable film has a flat surface and an optical structure surface, wherein the flat surface is opposite to the optical structure surface and disposed on the transparent resin layer. A central part of the optical structure surface includes a first prism group. The first prism group includes a plurality of first prisms, wherein the apex angles of the first prisms are in a range of 120 to 170 degrees. The light generated by the light source enters the light-entering surface of the cylindrical body via the light-adjustable film and the transparent resin layer.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
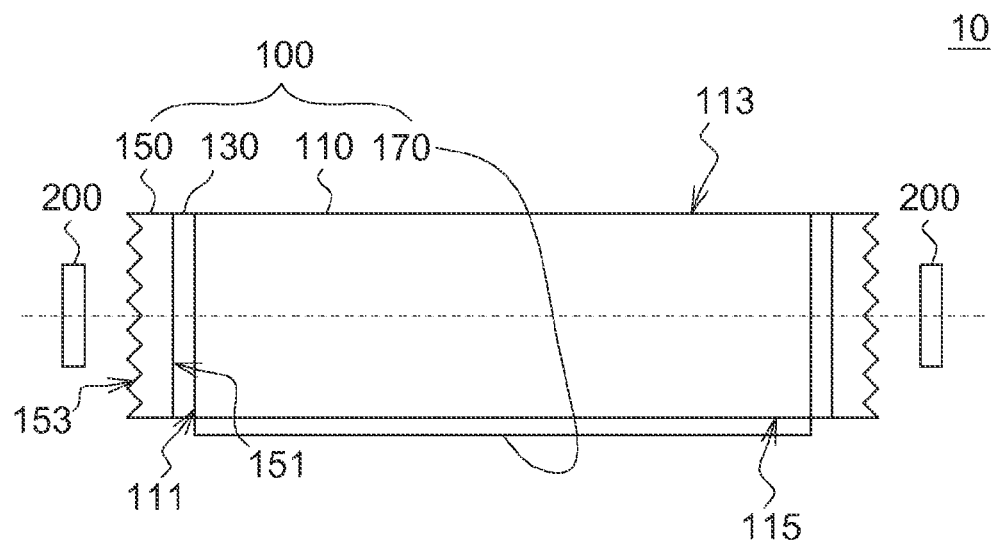
FIG. 1 shows a lighting device according to an embodiment of the disclosure.

Referring to FIG. 1, a lighting device according to an embodiment of the disclosure is shown. As indicated in FIG. 1, the lighting device 10 includes a light guiding object 100 and at least a light source 200. The light guiding object 100 includes a cylindrical body 110, a transparent resin layer 130, a light-adjustable film 150 and a reflective layer 170. The cylindrical body 110 has a light-entering surface 111, a light emitting surface 113 and a bottom surface 115. The reflective layer 170 is disposed on the bottom surface 115 of the cylindrical body 110. The transparent resin layer 130 is disposed on the light-entering surface 111 of the cylindrical body 110. The light-adjustable film 150 has a flat surface 151 and an optical structure surface 153, wherein the flat surface 151 is opposite to the optical structure surface 153 and is disposed on the transparent resin layer 130.

Figure 2A:
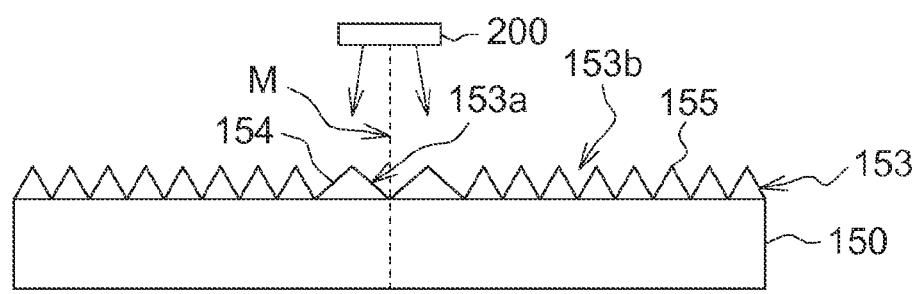
FIG. 2A shows a first embodiment of a light-adjustable film of a light guiding object for use in a lighting device of FIG. 1.

Referring to FIG. 2A, a first embodiment of a light-adjustable film 150 of a light guiding object 100 for use in a lighting device 10 of FIG. 1 is shown. In the first embodiment, a central part of the optical structure surface 153 of the light-adjustable film 150 includes a first prism group 153a. The first prism group 153a includes a number of first prisms 154, wherein the apex angles of the first prisms are in a range of 120 to 170 degrees of the first embodiment and are in a range of 125 to 150 degrees in another embodiment. Since the apex angles of the first prisms are in a range of 120 to 170 degrees or in a range of 125 to 150 degrees, after the light generated by the light source 200 enters the light guiding object 100, the total reflection of the light on the light-adjustable film or other dielectric interfaces can be greatly reduced. Thus, the leakage of the light is greatly reduced, and the light emitting efficiency of the light emitting surface 113 of the cylindrical body 110 is greatly increased.

The first prisms 154 can be symmetric to the central axis M of the light source 200 to increase the likelihood for the light generated by the light source 200 to enter the light guiding object 100. In addition, the optical structure surface 153 of the light-adjustable film 150 may include a second prism group 153b adjacent to the first prism group 153a. The second prism group 153b includes a number of second prisms 155. In the present embodiment of the disclosure, the apex angles of the second prisms 155 are different from the apex angles of the first prisms 154 of the first prism group 153a. For example, the apex angles of the first prisms 154 of the first prism group 153a can be 150 degrees, and the apex angles of the second prisms 155 can be 90 degrees.

The light-adjustable film 150 can be a light focusing film, a light diffusing film or a laser dot light guide plate. The transparent resin layer 130 can be made from pressure sensitive adhesion (PSA), optical clear adhesive (OCA) or liquid optical adhesive. The transparent resin layer 130 is disposed between the cylindrical body 110 and the light-adjustable film 150 for isolating the air layer, so that the interface reflection for the light generated by the light source 200 entering the light guiding object 100 is reduced and the light emitting efficiency of the light emitting surface 113 is increased. The reflective layer 170 can be a diffusive type reflective layer or a diffuse reflection type reflective layer for guiding the light entering the cylindrical body 110 off the light emitting surface 113.

Figure 2B:
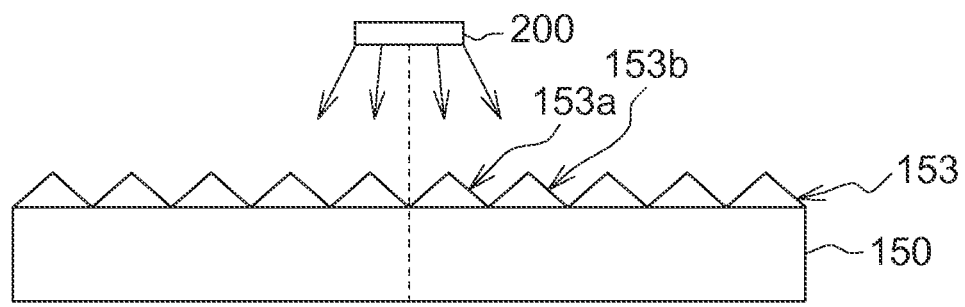
FIG. 2B shows a second embodiment of a light-adjustable film of a light guiding object for use in a lighting device of FIG. 1.

Referring to FIG. 2B, a second embodiment of a light-adjustable film 150 of a light guiding object 100 for use in a lighting device 10 of FIG. 1 is shown. The second embodiment of FIG. 2B is different from the first embodiment of FIG. 2A in that the apex angles of the second prisms 155 are the same with the apex angles of the first prisms 154 of the first prism group 153a, so that the total reflection between the light-adjustable film and other dielectric interfaces is reduced and the light emitting efficiency of the light emitting surface 113 is increased.

Figure 2C:
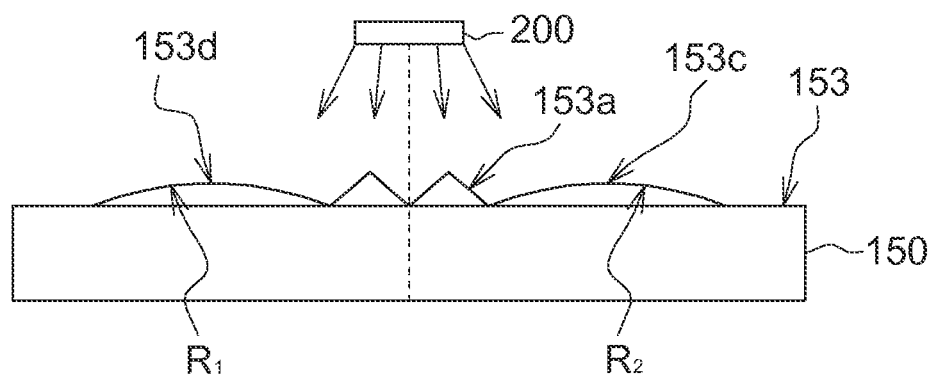
FIG. 2C shows a third embodiment of a light-adjustable film of a light guiding object for use in a lighting device of FIG. 1.

Referring to FIG. 2C, a third embodiment of a light-adjustable film 150 of a light guiding object 100 for use in a lighting device 10 of FIG. 1 is shown. The third embodiment of FIG. 2C is different from the first embodiment of FIG. 2A in that the light-adjustable film 150 includes a first curvature portion 153c and a second curvature portion 153d. The first curvature portion 153c and the second curvature portion 153d are respectively adjacent to the periphery of the first prism group 153a, and the first and the second curvature portions respectively have a first curvature radius $R_1$ and a second curvature radius $R_2$ which are respectively in a range of 5 to 20 mm.

The first curvature radius $R_1$ and the second curvature radius $R_2$ can be designed to be the same or different from each other. For example, if the light pattern of the light source 200 is symmetric, the first curvature radius $R_1$ and the second curvature radius $R_2$ can be designed to be the same. If the light pattern of the light source 200 is not symmetric or the light source 200 is biased, the first curvature radius $R_1$ and the second curvature radius $R_2$ can be designed to be different from each other, so that the total reflection between the light-adjustable film and other dielectric interface is reduced and the light incoming efficiency of the light source 200 is increased.

The lighting device of the disclosure includes a transparent resin layer and a light-adjustable film. The transparent resin layer is disposed on the light-entering surface of the cylindrical body. A central part of the optical structure surface of the light-adjustable film includes a prism group. The first prism group includes a plurality of first prisms, wherein the apex angles of the first prisms are in a range of 120 to 170 degrees, so that the light incoming efficiency is greatly increased, the leakage of the light is decreased and the luminance is increased. Furthermore, the transparent resin layer of the invention and the light-adjustable film with a prism group are adhered to a cylindrical body longer than 600 mm, not only increasing the overall luminance but also resolving the problems of decreased yield rate and prolonged production time caused by using the two sides of the cylindrical body as structure.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light guiding object for use in a lighting device, comprising:
    a cylindrical body having a light-entering surface and a bottom surface;
    a reflective layer disposed on the bottom surface of the cylindrical body;
    a transparent resin layer disposed on the light-entering surface of the cylindrical body; and
    a light-adjustable film having a flat surface and an optical structure surface, wherein the flat surface is opposite to the optical structure surface and is disposed on the transparent resin layer, a central part of the optical structure surface comprises a first prism group, the first prism group comprises a plurality of first prisms, and the apex angles of the first prisms are in a range of 120 to 170 degrees.

2. The light guiding object according to claim 1, wherein the apex angles of the first prisms are in a range of 125 to 150 degrees.

3. The light guiding object according to claim 1, wherein the first prisms are symmetric to a central axis of a light source.

4. The light guiding object according to claim 1, wherein the optical structure surface further comprises a second prism group adjacent to the first prism group, which comprises a plurality of second prisms.

5. The light guiding object according to claim 4, wherein the apex angles of the second prisms are different from the apex angles of the first prisms.

6. The light guiding object according to claim 1, wherein the optical structure surface further comprises a first curvature portion and a second curvature portion respectively adjacent to the periphery of the first prism group, and the first and the second curvature portions respectively have a first curvature radius and a second curvature radius.

7. The light guiding object according to claim 6, wherein the first curvature radius and the second curvature radius are respectively in a range of 5 to 20 mm.

8. The light guiding object according to claim 7, wherein the first curvature radius are the same with the second curvature radius.

9. The light guiding object according to claim 7, wherein the first curvature radius are different from the second curvature radius.

10. The light guiding object according to claim 1, wherein the transparent resin layer is made from a pressure sensitive adhesion (PSA), an optical clear adhesive (OCA) or a liquid optical adhesive.

11. The light guiding object according to claim 1, wherein the light-adjustable film is a light focusing film, a light diffusing film or a laser dot light guide plate.

12. A lighting device, comprising:
    a light guiding object, comprising:
        a cylindrical body having a light-entering surface and a bottom surface;
        a reflective layer disposed on the bottom surface of the cylindrical body;

a transparent resin layer disposed on the light-entering surface of the cylindrical body; and a light-adjustable film having a flat surface and an optical structure surface, wherein the flat surface is opposite to the optical structure surface and is disposed on the transparent resin layer, a central part of the optical structure surface comprises a first prism group, the first prism group comprises a plurality of first prisms, and the apex angles of the first prisms are in a range of 120 to 170 degrees; and a light source, wherein the light generated by the light source enters the light-entering surface of the cylindrical body via the light-adjustable film and the transparent resin layer.

* * * * *